June 17, 1930.  W. S. IRELAND  1,763,927
VALVE
Filed July 17, 1926
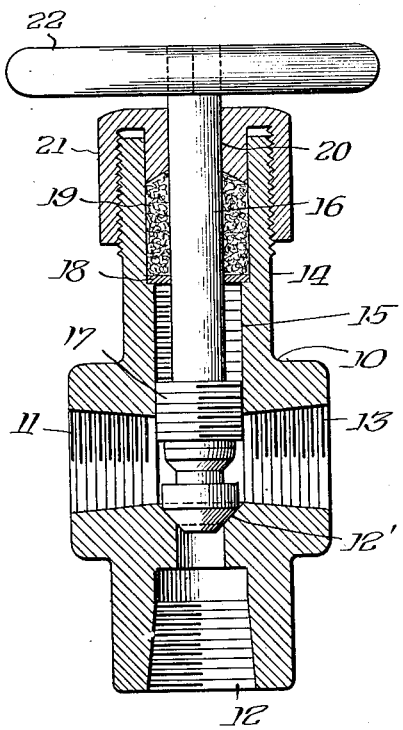
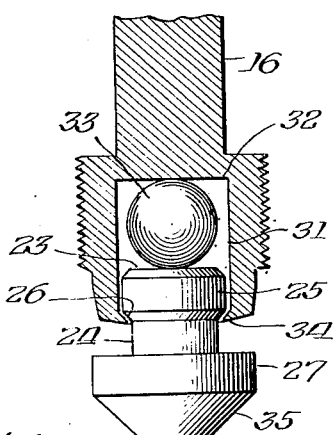
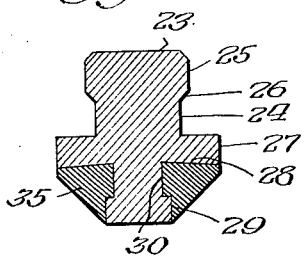
Inventor
Ward S. Ireland Patented June 17, 1930

1,763,927

UNITED STATES PATENT OFFICE

WARD S. IRELAND, OF BELOIT, WISCONSIN, ASSIGNOR TO NATIONAL REFRIGERATION CORPORATION, OF BELOIT, WISCONSIN, A CORPORATION OF DELAWARE

VALVE

Application filed July 17, 1926. Serial No. 123,063.

This invention relates to a valve and more particularly to a fluid control valve such as is used in connection with mechanical refrigeration systems in which an extremely tight and leak-proof fit between the valve and the valve seat are essential to its successful operation.

One of the objects of the present invention is to provide an improved and novel form of valve in which the valve is loosely supported in the valve stem so that the valve may properly align itself with the valve seat regardless of whether the valve stem is journaled in proper alignment with the valve seat.

A further object of the invention is to provide an improved form of valve in which the valve is swivelled in the stem in such a manner that when the valve is positioned on the valve seat, an extremely tight and leak-proof fit will exist between the valve and valve seat regardless of any imperfections which may be in the valve seat.

A still further object of the invention is to provide an improved valve in which the seat engaging portion of the valve consists of an alloy which is extremely hard and capable of resisting wear and abrasive action and at the same time possesses a relatively high co-efficient of elasticity enabling it to conform itself within a limited degree to any inequalities or irregularities which may be formed on the valve seat such as dirt or scales.

A still further object of the invention is to provide an improved form of valve in which the valve is swivellingly supported in the stem in such a manner that the valve may move relative to the stem and thereby eliminate the tearing action on the relatively softer metal of the closure member as the closure member seats itself on the valve seat.

These and other objects are accomplished by providing a construction and an arrangement of the various parts in the manner hereinafter described and particularly pointed out in the appended claims.

Referring to the drawing,

Fig. 1 is a vertical cross sectional view of a valve showing my improvement embodied therein.

Fig. 2 is an enlarged detailed view partly in cross section showing the manner in which the valve is swivellingly supported in the stem.

Fig. 3 is an enlarged detailed cross sectional view of the valve showing the manner in which my improved alloy which forms the valve seat engaging portion of the valve is secured to the valve.

For the purpose of illustration, I have shown my improved form of valve in connection with a valve casing as shown at 10 which in the present instance is provided with three-way connections as shown at 11, 12 and 13. The valve casing 10 is provided with the usual conically shaped valve seat 12' which is positioned in one of the connections 12. Extending upwardly and formed integrally with the casing 10 is the usual stem supporting barrel 14 which is provided with a vertically extending threaded bore 15. Mounted within the threaded portion is a valve stem 16 which has its lower end as shown at 17 enlarged and provided with threads for engagement with the threaded bore 15 of the valve casing 10. Surrounding the valve stem 16 is the usual washer 18 and packing 19. The upper end of the stem 16 is journaled in a bore 20 formed in a cap nut 21 which is in threaded engagement with the barrel 14 of the valve casing 10. The upper end of the stem is provided with the usual hand wheel 22 for operating the valve.

One of the important features of my improved valve construction is the provision of a novel connection between the valve or closure member and valve stem whereby the valve may align itself with respect to the valve seat even where the valve stem is improperly aligned with the valve seat. This comprises a valve or closure member 23 which has its upper end circular in cross section and its intermediate portion cut away to form an annular recess as shown at 24. This construction gives the upper end of the valve or closure member 23 an enlarged bearing portion 25 forming a bevelled shoulder 26 between the annular recess portion 24 and enlarged bearing portion 25. The valve is provided with an annular flange 27 intermediate its ends. The lower side of the annular flange is under-cut at an angle as shown at 28. The lower end of the valve or closure member 23 is provided with a relatively small flange 29 so as to form an annular recess 30 adjacent the lower end of the valve. This annular recess 30 together with the flanges 29 and 27 form a means for securing my improved alloy to the valve. The valve 23 is swivellingly supported in a circular socket 31 formed in the lower end of the stem 16. The base of the socket 31 is preferably flat in shape as shown at 32.

Positioned between the flat base 32 of the socket 31 and the top of the valve 23 is a steel bearing ball 33. The enlarged portion 25 of the valve 23 is of relatively smaller diameter than the diameter of the bore 31 so that there is a free swivelling or rocking movement as well as a slight bodily movement of the valve with respect to the stem 16. The valve 23 is prevented from displacement from the lower end of the stem by having a rib 34 rolled so as to engage the shoulder 26 of the valve.

From the above description it will be seen that by having the bearing ball 33 positioned between the upper surface of the valve 23 and the stem 16, and with the upper bearing portion 25 of the seat loosely mounted in the lower end of the socket 31 in the stem 16 that the valve or closure member 23 will be free to automatically adjust or align itself with the seat 12' of the valve so that in the event of any imperfections or irregularities formed on the seat, the valve will adjust itself so as to form an extremely tight and leak-proof fit between the valve and seat.

It will also be noted that should the valve stem be improperly positioned with respect to the seat, the closure member or valve by reason of its loose connection with the stem will properly adjust itself so as to form a tight and leak-proof fit with the seat.

The special alloy which I used in connection with my new form of valve or closure member is preferably composed of two constituents namely, tin and silver. A suitable alloy is described and claimed in my Patent 1,626,038 and another in my copending application Serial No. 105,267 filed April 28, 1926. The alloys consist of a major portion of tin with a sufficient amount of silver so as to produce an extremely hard alloy capable of resisting wear and abrasive action and at the same time possesses a relatively high co-efficient of elasticity so as to enable it to conform itself to a limited degree to the inequalities of foreign particles which may accumulate from time to time on the valve seat. Such an alloy is shown at 35 and is secured to the valve disc or closure member 23 and forms a contacting surface between the closure member and the valve seat. By reason of the under-cut as shown at 28 below the annular flange 27 of the valve disc or closure member 23 and the outwardly projecting flange 29 the alloy 35 is prevented from displacement from the valve disc.

While in the above specification I have described one embodiment which my invention may assume in practice, it will, of course, be understood that the same is capable of modification and that modification may be employed without departing from the spirit and scope of the invention as expressed in the following claims.

I claim:

A valve comprising a casing having a valve seat formed therein, a valve stem journaled in said casing and having a longitudinally extending socket formed in the lower end thereof, a closure member having an enlarged bearing portion at the upper end thereof, an inwardly extending annular rib formed on the lower end of said stem and loosely embracing said bearing portion for loosely retaining said closure member in said socket and a bearing ball loosely mounted in said socket between said bearing portion and the inner end of the socket and contacting with said closure member whereby said closure member may properly align itself on said valve seat.

In witness of the foregoing I affix my signature.

WARD S. IRELAND.